United States Patent [19]

Wesala

[11] Patent Number: 4,491,607

[45] Date of Patent: Jan. 1, 1985

[54] MOLD RELEASE AGENTS AND MEANS OF APPLICATION

[75] Inventor: Robert J. Wesala, Dearborn, Mich.

[73] Assignee: Park Chemical Company, Detroit, Mich.

[21] Appl. No.: 323,782

[22] Filed: Nov. 23, 1981

[51] Int. Cl.³ .................................................. B29C 1/04
[52] U.S. Cl. ................................. 427/135; 106/38.24; 264/338; 427/388.4; 427/421; 252/41; 252/49.3
[58] Field of Search ...................... 427/133, 135, 388.4, 427/421; 106/38.24; 264/130, 338; 252/41, 49.3; 249/115

[56] References Cited

U.S. PATENT DOCUMENTS

| | | | |
|---|---|---|---|
| 3,278,430 | 10/1966 | Williams | 252/49.3 |
| 3,860,521 | 1/1975 | Aepli et al. | 252/49.3 |
| 3,952,079 | 4/1976 | Ozelli et al. | 264/338 X |
| 4,038,088 | 7/1977 | White et al. | 106/38.24 |
| 4,118,235 | 10/1978 | Horiuchi et al. | 427/135 X |

FOREIGN PATENT DOCUMENTS 2702930  7/1978  Fed. Rep. of Germany .

*Primary Examiner*—John D. Smith
*Assistant Examiner*—Bernard F. Plantz
*Attorney, Agent, or Firm*—Krass and Young

[57] ABSTRACT

Mold release agents and means for their application are provided. The release agents are used in coating molds for forming expandible plastics. They are especially applicable to polyurethane-based reaction injection molding (RIM) systems. The release agents, which have a controlled saponified fatty acid content (unsaturated as oleate and/or linoleate and saturated as $C_8$ to $C_{12}$ alkanoate) make for significant advantage with respect to ease of release, prevention of residual build-up, mold and part cleanability, health and safety, cost, etc.

13 Claims, No Drawings

MOLD RELEASE AGENTS AND MEANS OF APPLICATION

TECHNICAL FIELD

This invention relates to mold release agents and means for their application. More particularly, the invention relates to release agents used in coating molds for forming plastics, especially in connection with reaction injection molding (RIM) of expandible polyurethane plastics.

BACKGROUND ART

Mold release agents, as reported in "The Mold Release Quandary", *Plastics Technology*, pages 65-70 September, 1980, must form a film or vapor interlayer on the mold tool surface. This layer should be inert to the molding material and not attack the tool surface. At the end of each molding cycle, the release agent should also enable an easy release of the molded part such that the part has no surface attack or visible surface defect, in other words, a "Class A Surface". A release agent generally contains a blend of several ingredients including active ingredient which causes the release action, a solvent, a film-former, a drying or curing agent, and added lubricant to enhance releasability. Ingredients can range from greases, natural waxes, soaps, emulsions, mineral oils, fats, lecithins, metal stearates, silicones, fluorocarbons, synthetic waxes, organophosphates, polyaliphatic alcohols and polymeric resins. There are several key criteria (other than those mentioned) for selecting a particular mold release agent such as ability to clean the release agent from the mold, compatibility of the release agent (if carried away on the part surface or if allowed to build-up on the mold surface), health and safety risks of exposure to flammable or toxic ingredients of the release agent, and relative cost both of the release agent and its use. Ideally, the release agent when coated as a layer onto the tool surface should not be too soft so that it is removed or "scrubbed" each time the resin is injected into the mold. In other words, it should be sufficiently hard that it remains intact (i.e., does not flake-off or transfer to the part) as a suitable release layer for a number of injection and release cycles, without requiring replacement. Also, the release layer once established should remain sufficiently protective that the resin or foam does not "strike through" and build-up unreleasably on the tool surface. Further, it should not retain water. For example, in the case of isocyanate-reacting foams, water causes the formation of polyurea which is an undesirable part surface contaminant that causes problems with later steps of processing the part. It has been proposed to use a high molecular weight saturated or unsaturated fatty acid soap such as the oleate or the isostearate as a release agent for polyurethane reaction injection molding. The difficulty with use of an oleate or isostearate release agent, however, is that each is associated with part surface attack, water retention, polyurea build-up and/or foam build-up.

It is therefore an object of the present invention to provide novel mold release agents and means of application which agents are applied as a durable yet readily cleanable protective release layer or coating on mold surfaces for purposes of plastic molding.

It is also an object of the invention to provide mold release agents for polyurethane molding which, in coated form for the molding and release of parts, perform efficiently without substantial scrubbing, flaking, part surface attack, water retention, polyurea build-up, strike-through or foam build-up.

It is a further object to provide mold release agents and means for their application which can be safely employed in an industrial environment.

It is still another object to provide mold release agents which are economical, can be washed from the parts prior to painting, and are disposable at low cost by ordinary waste disposal methods.

These and other objects, features and advantages will be seen from the following detailed description of the invention.

SUMMARY AND DETAILED DESCRIPTION

The invention in one aspect concerns a mold release agent for coating molds and mold tool surfaces for forming expandible plastics, constituted as an aqueous formulation with alkali metal hydroxide at a hydrogen ion concentration in the range from about pH 8.5 to about pH 11 containing in admixture a minor proportion of saponified $C_{18}$ unsaturated fatty acid and $C_8$ and $C_{12}$ saturated fatty acid, the fatty acid content being from about 40 to about 90% by weight unsaturated and from about 10 to 60% by weight saturated. The fatty acid content expressed as total free acid preferably is from about 1 to about 30% by weight of the formulation. The formulation may be in ready-to-use form or may be in concentrated form dilutable with water, with pH adjustment if necessary, to provide any desired ready-to-use dilution. Mold release agents containing saponified $C_{18}$ unsaturated fatty acid and $C_8$ to $C_{12}$ saturated fatty acid, according to the invention, uniquely fulfill the many exacting requirements not met by prior agents. Thus, while mold release agents based on saponified unsaturated higher fatty acid alone may fall short with respect to characteristics such as ease of release, agents which also contain a $C_8$ to $C_{12}$ saturated fatty acid soap or mixture of such soaps, it is found, surprisingly perform the desired functions with great efficiency. The presence of the latter component increases film hardness, results in less transfer to the molded part, improves water evaporation, reduces "strike-through", and reduces build-up contamination of polyurea and foam. In the description which follows, the invention will be described with particular emphasis on polyurethane RIM technology. However, it will be realized that the invention broadly applies to plastics injection molding generally.

As indicated, the mold release agents of the invention contain a minor proportion of fatty acid soap, preferably about 1 to about 30% by weight, expressed as free acid, both $C_{18}$ unsaturated and $C_8$ to $C_{12}$ saturated. The saponified unsaturated fatty acid employed in the formulation may be an oleate, linoleate or mixture of oleate and linoleate. Saponified saturated fatty acid may be any one or more of $C_8$ to $C_{12}$ alkanoates such as caprylate ($C_8$), pelargonate ($C_9$), caprate ($C_{10}$), undecylate ($C_{11}$) and laurate ($C_{12}$). Pelargonate is a preferred alkanoate for purposes of the invention, which, as presently described, is preferably formulated in situ by neutralizing pelargonic acid with alkali metal hydroxide. The alkali metal hydroxide used is a so-called $3_S$-$4_S$ alkali metal hydroxide, namely sodium hydroxide, potassium hydroxide, or a mixture of the same. For formulation purposes, the compositions of the invention can be made up in any suitable way. For example, the free acids in the mentioned proportions conveniently are incorporated at ambient temperature in dilute aqueous alkali metal hydroxide solution, such that the corresponding alkali metal soaps are formed in situ. The invention also contemplates using preformed soaps. Sufficient hydroxide is employed to neutralize the free acids and maintain the pH of the finished formulation in the approximate range from pH 8.5 to pH 11. A preferred mold release agent is one constituted at pH 9.5 to pH 10 with sodium hydroxide and/or potassium hydroxide in water preferably containing oleic acid or linoleic acid, preferably about 3.75% by weight, and about 1.25% by weight pelargonic acid. If desired, the formulations of the invention may include compatible excipients such as any surfactant, stabilizer, etc., which meets the objectives of the invention.

The invention in another aspect concerns a method of coating a mold with a release agent having the above-described constituency, comprising the steps of applying a uniform wet film of the release agent onto the surfaces of a mold maintained at elevated temperature sufficient to vaporize water from the film, and maintaining the coated mold at elevated temperature until the thus applied film is dry. Advantageously, the method avoids the use of hazardous, expensive solvents. The film coat can be applied in any suitable way such as spraying (air, airless, electrostatic or aerosol) brushing, wiping or rolling. In a preferred case, using a Binks 62 spray gun at 12 inch distance, the release agent is sprayed for five seconds nearly perpendicular to each vertical surface and bottom surface of the mold preheated to 120° to 140° F. Normal conditions are 30 psi, liquid flow 1 turn, air flow 1½ turns. Two applications are made for the first part and one application before each additional part. For drying, the coated mold is reheated to 120° to 140° F. for ten minutes.

The invention is illustrated by the following examples of preferred mold release agents.

EXAMPLE 1

| Component | Percent by Weight |
| --- | --- |
| Oleic acid | 3.75 |
| Pelargonic acid | 1.25 |
| Sodium hydroxide | 0.86 |
| Water | 94.14 |

A container is charged with the water at room temperature. The sodium hydroxide is carefully added with agitation until dissolved. The oleic acid and pelargonic acid are then slowly added with thorough mixing. When addition is complete, the pH is adjusted to pH 9.5–10, if necessary. The resulting solution is filtered through a fine mesh screen to remove solids. The resulting solution is a ready-to-use formulation. When sprayed onto mold surfaces as described above, it serves as a useful mold release agent for polyurethane RIM systems. One such preferred polyurethane/RIM foam system known as the 042 system designed for high density molding applications is available from Polyblends, Inc., Livonia, Michigan, as PB042 resin/PX042 isocyanate. The system uses a 2:1 resin/isocyanate weight ratio at a material temperature of 70°–75° F./70°–85° F. and mold temperature of 120°–140° F. with demold for 8 minutes at 140° F. Concentrate formulations, dilutable with water at the site of use, are made in the same way using, however, less water. For example, one may use from about ¼ to ½ the amount of water for this purpose.

EXAMPLE 2

Other preferred mold release agents (and controls) are prepared by the procedure of Example 1 but use differing proportions of components as follows:

| Component | 2a | 2b | 2c | Control A | Control B |
| --- | --- | --- | --- | --- | --- |
| Oleic acid | 3.0 | 2.5 | 2.0 | 5 | — |
| Pelargonic acid | 2.0 | 2.5 | 3.0 | — | 5 |
| NaOH | 0.925 | 0.985 | 1.03 | 0.73 | 1.25 |
| Water | 94.075 | 94.015 | 93.97 | 94.27 | 93.75 |

EXAMPLE 3

Still other preferred mold release agents (and controls) are prepared by the procedure of Example 1 but use other components as follows:

| Component | 3a | 3b | 3c | 3d | 3e | Control C | Control D |
| --- | --- | --- | --- | --- | --- | --- | --- |
| Oleic acid | 2.5 | — | — | 3.75 | 2.5 | 5 | — |
| Pelargonic acid | 2.5 | 1.25 | 2.5 | — | — | — | 5 |
| Lauric acid | — | — | — | 1.25 | 2.5 | — | — |
| KOH | 1.4 | — | — | — | — | 1.0 | 1.75 |
| Linoleic acid | — | 3.75 | 2.5 | — | — | — | — |
| NaOH | — | 0.86 | 0.985 | 0.78 | 0.86 | — | — |
| Water | 93.6 | 94.14 | 94.015 | 94.22 | 94.14 | 94 | 93.25 |

Similar formulations are obtained by replacing pelargonic acid or lauric acid with any of caprylic, capric and undecylic acids in equal amounts.

In a performance comparison using the 042 system in a standard test mold, the following typical mold release characteristics were noted.

TABLE I

Mold Release (042 RIM)
Mold Release Agent of Example 1, 2 and 3

| Test Characteristics | 1 | 2a | 2b | 2c | 3b | 3d | 3e | 2-Control A |
| --- | --- | --- | --- | --- | --- | --- | --- | --- |
| Release force (lbs.) | 12 | 12 | 12 | 16 | 17 | 14 | 13 | 12 |
| Flake-off* | ++ | + | + | + | ++ | ++ | ++ | ++++ |
| Polyurea build-up, % | 7.2 | 2.1 | 1.5 | 1.7 | 8.3 | 6.7 | 3.4 | 8.4 |

*Rating:
+ = none or very slight
++ = slight
+++ = moderate
++++ = heavy

These results show that the release agents of the invention containing alkanoate and octadecenoate had good release, little or no flake-off, and, with one exception, low polyurea build-up. The release agents containing pelargonate and linoleate released similarly to the Example 1 agent and were satisfactory. The control with sodium oleate had acceptable release, but heavy flake-off and substantial polyurea build-up.

Using the Mobay ®26 polyurethane RIM system which is a commercial system for the production of steering wheels, the following typical characteristics were noted.

TABLE II

| | Mold Release | | | |
|---|---|---|---|---|
| | Mold Release Agent of Examples 1 and 2 (Mobay RIM) | | | |
| Test Characteristic | 1 | 2b | 2-Control A | 2-Control B |
| Release force (lbs.) | 15 | 18 | 18 | 23 (dries crystalline) |
| Flake-off | +++ (<25%) | + | ++++ (>50%) | — |
| Polyurea build-up, % | 4.1 | 1.5 | 4.2 | — |
| Part surface | — | excellent | — | very rough |

These results show that the release from the controls which contain sodium oleate or pelargonate only is unsatisfactory. By comparison, the release using the compositions of the invention containing both oleate and pelargonate was quite satisfactory.

Again, using the 042 system in a standard test mold, the following typical characteristics were noted.

TABLE III

| | Mold Release (042 RIM) | | |
|---|---|---|---|
| | Mold Release Agent of Example 3 | | |
| Test Characteristic | 3a | Control C | Control D |
| Release force (lbs.) | 6 | 6 | >18 |
| Part surface | slightly porous | — | porous |
| Polyurea build up, % | 1.8 | 1.4 | — |
| Water retention, % | 0.33 | 0.6 | — |
| Foam build-up, % | 0.15 | 2.3 | — |
| Flake-off | — | — | ++++ (ca. 100%) |

These results show that in a single run the controls containing potassium oleate or pelargonate only either had high water retention and form build-up or yielded a porous part surface and practically complete flake-off of the release agent. By comparison, the release agent of the invention containing potassium oleate and pelargonate showed only slight porosity of the part surface and only slight water retention and foam build-up.

The embodiments of the invention in which an exclusive property or privilege is claimed are defined as follows:

1. A mold release agent for coating molds for forming expandable plastics, constituted as a solid-free aqueous fatty acid soap formulation with at least one alkali metal hydroxide selected from the group consisting of sodium hydroxide and potassium hydroxide at a hydrogen ion concentration in the range from about pH 8.5 to about pH 11, consisting essentially of saponified $C_{18}$ unsaturated fatty acid $C_8$ to $C_{12}$ saturated fatty acid, the fatty acid content being from about 40 to 90% by weight unsaturated and from about 10 to 60% by weight saturated and further, expressed as total free acid, being about 1 to about 30% by weight of the formulation.

2. A mold release agent according to claim 1 containing about 5% fatty acid including about 1.25% pelargonic acid.

3. A mold release agent according to claim 1 containing about 5% fatty acid including about 2.0% pelargonic acid.

4. A mold release agent according to claim 1 containing about 5% fatty acid including about 2.5% pelargonic acid.

5. A mold release agent according to claim 1 containing about 5% fatty acid including about 3.0% pelargonic acid.

6. A mold release agent according to claim 1 containing oleic acid.

7. A mold release agent according to claim 1 containing linoleic acid.

8. A mold release agent according to claim 1 where the alkali metal hydroxide is sodium hydroxide.

9. A mold release agent according to claim 1 where the alkali metal hydroxide is potassium hydroxide.

10. A mold release agent for coating molds for polyurethane-based RIM systems according to claim 1 containing oleate and pelargonate soaps.

11. A mold release agent for coating molds for polyurethane-based RIM systems according to claim 1 obtained by neutralizing about 3.75% oleic acid and about 1.25% pelargonic acid with sodium hydroxide.

12. A method of coating a mold with a release agent, comprising the steps of applying a uniform wet film of the release agent according to claim 1 onto the mold surfaces of a mold maintained at elevated temperature sufficient to vaporize water from the film and maintaining the mold at elevated temperature until the thus applied film is dry.

13. A method of coating according to claim 12 where the film is applied by spraying.

* * * * *

UNITED STATES PATENT AND TRADEMARK OFFICE
CERTIFICATE OF CORRECTION

PATENT NO. : 4,491,607
DATED : January 1, 1985
INVENTOR(S) : Robert J. Wesala

It is certified that error appears in the above—identified patent and that said Letters Patent are hereby corrected as shown below:

Column 6, line 5, after "fatty acid" (first occurrence) insert --,--.

Signed and Sealed this

Fourth Day of June 1985

[SEAL]

Attest:

DONALD J. QUIGG

Attesting Officer     Acting Commissioner of Patents and Trademarks